(12) United States Patent
Hillstrom et al.

(10) Patent No.: US 8,954,023 B2
(45) Date of Patent: Feb. 10, 2015

(54) ADAPTIVE POLARIZATION ARRAY (APA)

(75) Inventors: Timothy Leonard Hillstrom, Liberty Lake, WA (US); Robert J. Conley, Liberty Lake, WA (US)

(73) Assignee: LHC2 Inc, Liberty Lake, WA (US)

( * ) Notice: Subject to any disclaimer, the term of this patent is extended or adjusted under 35 U.S.C. 154(b) by 0 days.

(21) Appl. No.: 13/529,968

(22) Filed: Jun. 21, 2012

(65) Prior Publication Data

US 2012/0329416 A1 Dec. 27, 2012

Related U.S. Application Data

(60) Provisional application No. 61/500,747, filed on Jun. 24, 2011.

(51) Int. Cl.
*G01R 29/26* (2006.01)
*H01Q 21/24* (2006.01)
*H04B 7/10* (2006.01)

(52) U.S. Cl.
CPC ............... *H01Q 21/245* (2013.01); *H04B 7/10* (2013.01)
USPC ...................................... 455/226.3; 455/3.02

(58) Field of Classification Search
USPC ......... 455/1, 226.3, 562.1; 370/342; 359/301; 375/343
See application file for complete search history.

(56) References Cited

U.S. PATENT DOCUMENTS

| | | |
|---|---|---|
| 2004/0264592 A1 | 12/2004 | Sibecas et al. |
| 2007/0047678 A1* | 3/2007 | Sibecas et al. ................ 375/343 |
| 2007/0191067 A1* | 8/2007 | Nguyen et al. ............ 455/562.1 |
| 2009/0103720 A1 | 4/2009 | Karayil Thekkoott Narayanan |
| 2009/0197544 A1 | 8/2009 | Petersson et al. |
| 2009/0213453 A1* | 8/2009 | Yao .............................. 359/301 |
| 2010/0003034 A1* | 1/2010 | Pratt et al. ..................... 398/152 |
| 2010/0098044 A1* | 4/2010 | Pratt et al. ..................... 370/342 |
| 2011/0032159 A1* | 2/2011 | Wu et al. ....................... 343/702 |
| 2012/0302155 A1* | 11/2012 | Marsolais et al. ................ 455/1 |
| 2013/0331039 A1 | 12/2013 | Hillstrom et al. |

OTHER PUBLICATIONS

The PCT Search Report mailed Jan. 31, 2013 for PCT application No. PCT/US12/43836, 9 pages.

* cited by examiner

*Primary Examiner* — Wesley Kim
*Assistant Examiner* — Raj Chakraborty
(74) *Attorney, Agent, or Firm* — Lee & Hayes, PLLC

(57) ABSTRACT

An Adaptive Polarization Array (APA) Algorithm is described for adjusting the polarization orientation of antennas, such as Dual-polarized array antennas. The APA Algorithm searches to find a polarization state that maximizes a signal quality of a received signal in the presence of interfering signals and noise. The search facilitates adjustment of a polarization state of, for example, receive antennas to maximize a signal quality metric. A proxy metric having no local maxima other than the global maximum is used to search the polarization search domain to find a best polarization state.

19 Claims, 6 Drawing Sheets

ADAPTIVE POLARIZATION ARRAY (APA)

CROSS-REFERENCE TO RELATED APPLICATIONS

This application claims priority to provisional application Ser. No. 61/500,747, filed Jun. 24, 2011, entitled "Adaptive Polarization Array (APA)", the entirety of which is incorporated by reference herein.

BACKGROUND

Wireless communication has become an integral part of modern life in personal and professional realms. It is used for voice, data, and other types of communication. Wireless communication is also used in military and emergency response applications. Communications that are made wirelessly rely on the electromagnetic spectrum as the carrier medium. Unfortunately, the electromagnetic spectrum is a limited resource.

Although the electromagnetic spectrum spans a wide range of frequencies, only certain frequency bands are applicable for certain uses due to their physical nature and/or due to governmental restrictions. Moreover, the use of the electromagnetic spectrum for wireless communications is so pervasive that many frequency bands are already over-crowded. This crowding may cause interference between and among different wireless communication systems.

Such interference jeopardizes successful transmission and reception of wireless communications that are important to many different aspects of modern society. Wireless communication interference can necessitate retransmissions, cause the use of ever greater power outlays, or even completely prevent some wireless communications. Consequently, there is a need to wirelessly communicate in the presence of electromagnetic interference that may otherwise hinder the successful communication of information. Use of horizontal polarization may improve communications reliability by reducing interference from predominantly vertically polarized signals in overlapping and adjacent frequency bands. Conversely the application of vertical polarization in an environment dominated by horizontally polarized interference may improve communication reliability.

Multipath fading results in reduced communications reliability, particularly where mobile devices pass through signal fades. Linearly polarized communication systems may generally be more susceptible to multipath fading than elliptically or circularly polarized systems. Mobile systems typically require an omni-directional antenna pattern on the client devices. An omni-directional antenna is characterized by an azimuthal radiation pattern that exhibits minimal antenna gain variation. Dual polarized (D-pol) omni-directional antennas allow for an increase in data throughput by exploiting nominally orthogonal vertical and horizontal polarizations associated with individual respective vertical and horizontal channels.

However, due to the nature of systems having D-pol omni-directional mobile antennas, the relative orientation of the vertical and horizontal polarizations between transmit and receive antennas may vary based on movement within the mobile system, or other inherent sources of transmit-receive antenna polarization misalignment. Additionally, the relative orientation of the vertical and horizontal polarizations in some antennas may be modified electronically, such as in circularly and elliptically polarized antenna systems.

For purposes of this disclosure, non-equal polarization is defined by two or more polarization states separated from each other on the Poincaré Sphere. In contrast, exactly orthogonal polarization is defined by two polarization states separated exactly by 180 degrees on the Poincaré Sphere. Additionally, nominally orthogonal polarization is defined by two or more polarization states that may deviate from being exactly orthogonal based on standard commercial manufacturing and deployment variations or tolerances.

There are a number of existing methods that address polarization mismatch between a transmitter and a receiver as well as multipath fading. For example, spatial diversity uses two or more antennas separated in space, thereby experiencing differing fading environments. Polarization diversity uses two or more antennas exhibiting differing polarization states. These two diversity techniques can take on various implementations. For example, the technique referred to as switched diversity, selects one of the antennas that exhibits the best quality metric. Maximum Ratio Combining (MRC) combines the outputs of all antennas simultaneously to maximize the Signal to Noise Ratio SNR. Minimum Mean Square Error (MMSE) and Optimal combining, like MRC, makes use of one or more antenna and can maximize SINR. However, MMSE and Optimal combining require carrier recovery as an integral component of the algorithm.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Introduction

Figure 1:
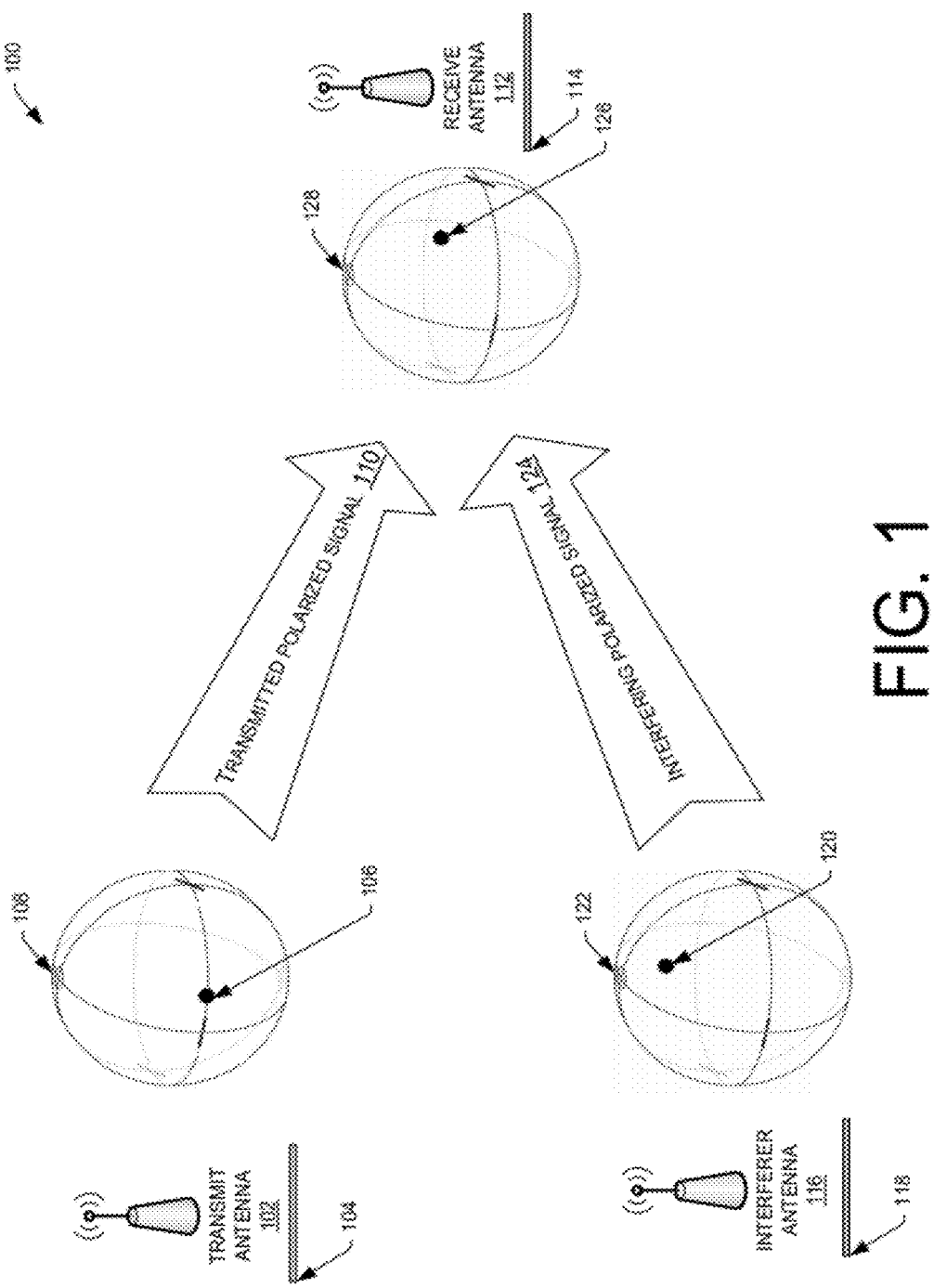
FIG. 1 illustrates a perspective view of a transmit antenna polarization state, a receive antenna polarization state and an interfering signal antenna polarization state.

This disclosure relates to techniques for an Adaptive Polarization Array (APA) Algorithm for adjusting the polarization of an antenna over all polarization states. For example, as a first option, a polarization state of a receive antenna may be adaptively adjusted to maximize the quality of a received signal by minimizing path loss caused by polarization misalignment. As a second option, the polarization state of the receive antenna may be adaptively adjusted to minimize an interference signal. The receive polarization state for the first and second options may not be the same state. Thus, in a third option, an optimum state may be found on the shortest great circle arc on the Poincaré Sphere between the first and second options. Signal quality may be monitored by dynamically measuring a signal quality metric such as Signal to Noise Ratio (SNR), Signal to Interference plus Noise Ratio (SINR), or any other suitable signal quality metric. For example, methods, algorithms, techniques, systems, devices, etc. are disclosed herein for combining antennas with nominally orthogonal polarizations or non-equal polarizations to emulate an antenna with any arbitrary polarization state. Thus, a polarization state of an antenna may be dynamically adjusted to optimally increase co-polarization of the transmit-receive antennas while decreasing the co-polarization (e.g., increasing the cross-polarization) of the interferer-receive antennas. This optimum state maximizes the signal quality metric of interest, such as the SINR.

Methods are described herein to determine appropriate adjusted polarization states that rely on performing a fast search over, for example, a polarization search domain. The search of the polarization search domain may be performed to maximize a metric which serves as an exact proxy for an estimated signal quality metric. The search domain may include a mapping of a surface of a Poincaré Sphere to the polarization search domain. To enhance the search of the polarization search domain, a proxy signal quality metric may be selected that has a single global maximum over the polarization search domain. To further enhance the search, the proxy signal quality metric may also be selected to have no local maxima other than the single global maximum.

An antenna operated such that the electric field emanating from the antenna is parallel to a plane defined by the surface of the earth is said to be a horizontally polarized antenna. An antenna operated such that the electric field emanating from the antenna is perpendicular to the plane defined by the surface of the earth is said to be a vertically polarized antenna.

A vertically polarized antenna may be coupled to the horizontally polarized antenna resulting in a dual-polarized (D-pol) antenna system. The vertically polarized antenna may be physically separate from the horizontally polarized antenna, or the horizontally polarized and the vertically polarized antennas may be physically coupled.

A D-pol antenna may be mounted or operated with the physical vertical axis of the antenna being substantially perpendicular to a plane defined by the surface of the earth, and still emanate electric fields that are parallel to, and perpendicular with, the surface of the earth.

D-pol antennas may be configured to, for example, transceive signals in a horizontal, vertical, or elliptical polarization orientation, and may do so in an omni-directional manner. D-pol antennas transmitting a signal may achieve any desired polarization orientation by applying judicious amplitude and/or phase modulation to input ports of the respective antenna. A D-pol antenna receiving a signal may achieve any desired polarization orientation by applying judicious amplitude and/or phase demodulation to output ports of the respective antenna. The output ports may coincide with, for example, a corresponding vertical channel and a horizontal channel associated with the nominally orthogonal polarizations of the receive antenna.

The vertical and horizontal signal outputs of, for example, the receive antenna, may be combined to emulate a single receive antenna of any arbitrary polarization orientation (i.e., polarization state). By adaptively adjusting the polarization orientation of the receive antenna to substantially align with the polarization orientation of the transmit antenna, signal loss attributed to antenna polarization misalignment can be minimized. Transmit and receive antennas with their polarization orientation so aligned are said to have the same polarization state (e.g., co-polarized). In addition, by adaptively adjusting the polarization orientation of the receive antenna to substantially misalign with the polarization orientation of an interfering antenna, signal path loss attributed to antenna polarization misalignment can be maximized. Antennas with their polarization state so aligned are said to have an orthogonal polarization state (e.g., cross-polarized).

The polarization state of a signal from a transmitting antenna may undergo polarization scattering as it passes through, and/or is reflected off objects in the communications channel. For the purposes of this disclosure any change in the polarization state of a signal as received at the receiving antenna, due to scattering in the channel, is referred back to the transmitting antenna as the apparent polarization of the transmitting antenna.

Search techniques may be employed over a polarization search domain to find an optimum polarization state based on, for example, searching to maximize a selected signal quality metric. An estimate of a Signal to Interference plus Noise Ratio (SINR) may be used as an appropriate signal quality metric in an associated search technique, however, other signal quality metrics may also be used. The search algorithm (as well as a closed form solution described below) finds the optimum metric performance regardless of the degree of orthogonality between the antennas. However, the algorithm performance is maximized when the antennas are perfectly (e.g., exactly) orthogonal.

Additionally, such searches may be complicated by numerous local maxima and local minima associated with the signal quality metric used to search over the polarization search domain. To address these issues, a "proxy" for the signal quality metric may be determined that minimizes the complications incurred by the numerous local maxima and local minima encountered in the search domain. Such a proxy would greatly speed convergence of the search technique. For example, as described herein, a proxy for the signal quality metric may be determined that has a single global maximum over the search domain, and absent local maxima other than the single global maximum. The use of such a proxy results in rapid convergence of the search technique to the global maximum. Furthermore, since only a single global maximum may exist, the single global maximum represents an optimum solution.

Techniques are described herein for identifying a proxy metric, defining an appropriate mapping for a polarization search domain, and using the proxy to search the mapping of the polarization search domain to adaptively optimize the quality metric, thereby adjusting the polarization state of an antenna based on the searching In one or more implementations described herein, techniques are described that do not require carrier recovery, and are therefore applicable to systems that either do not require carrier recovery in the demodulation technique or are not suitable for carrier recovery such as many legacy amplitude or frequency modulated systems with variable or unstable carrier phase.

While described individually, the foregoing embodiments are not mutually exclusive and any number of embodiments may be present in a given implementation. Moreover, other algorithms, antennas, systems, apparatuses, methods, devices, arrangements, mechanisms, approaches, etc. are described herein.

Example Environment

FIG. 1 illustrates an example environment 100 for transmitting and receiving polarized signals. For example, transmit antenna 102 may be a D-pol antenna fed via horizontal and vertical channels. Transmit antenna 102 may be mounted to surface 104. Transmit antenna 102 may be oriented perpendicular to surface 104, substantially perpendicular to surface 104, not substantially perpendicular to surface 104, or the like. Surface 104 may correspond to a horizontal plane coincident with the surface of the earth, or some other surface.

Transmit antenna 102 may have a polarization state 106, as represented on a Poincaré Sphere 108, used to transmit transmitted polarized signal 110 to receive antenna 112.

Receive antenna 112 may include a mobile D-Pol antenna mounted to, for example, a moving vehicle or other stationary or mobile entity. Receive antenna 112 may be mounted to surface 114 (e.g., a stationary or moving vehicle) such that receive antenna 112 is perpendicular to surface 114, substantially perpendicular to surface 114, not substantially perpendicular to surface 114, or the like.

Due to the potentially mobile nature of receive antenna 112, a two-dimensional plane representing surface 104 and a two-dimensional plane representing surface 114 may not coincide in one or both of their two dimensions. Thus, surfaces 104 and 114 may not be angularly aligned. Also, mounting differences, errors or inconsistencies of transmit antenna 102 and/or receive antenna 112 may also exist.

Environment 100 may also contain one or more sources of electromagnetic interference. For purposes of simplicity, a single interferer antenna 116, mounted to surface 118, is illustrated in FIG. 1. Interferer antenna 116 may be oriented perpendicular to surface 118, substantially perpendicular to surface 118, not substantially perpendicular to surface 118, or the like. Surface 118 may correspond to a horizontal plane coincident with the surface of the earth, or some other surface. Interferer antenna 116 may have a polarization state 120, as represented on a Poincaré Sphere 122, used to transmit interfering polarized signal 124 to receive antenna 112.

In an aspect, based on the reception of transmitted polarized signal 110 and interfering signal 124, receive antenna 112 may have an adjusted polarization state 126, as represented on a Poincaré Sphere 128. The adjusted polarization state 126 may be selected to maximize or optimize an estimated signal quality metric, such as SINR.

Figure 2:
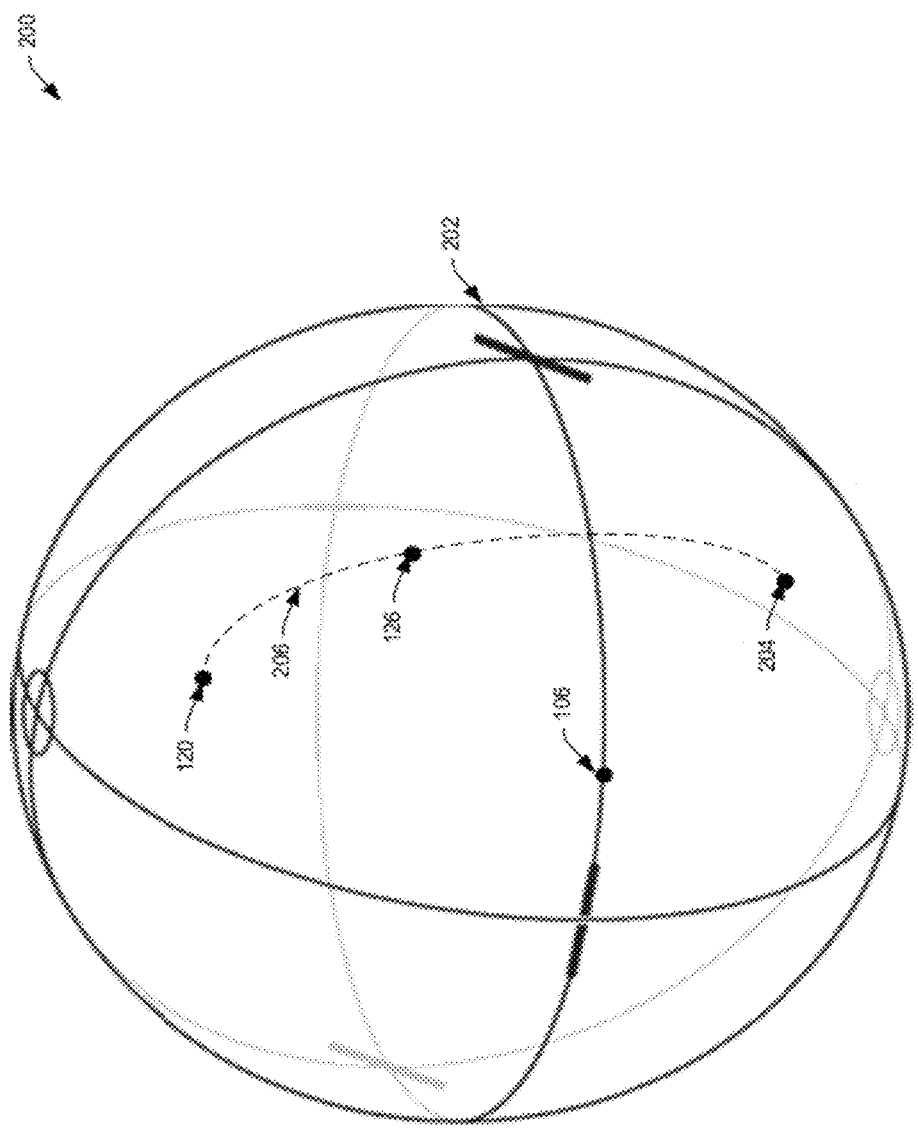
FIG. 2 illustrates a Poincaré Sphere showing an adjusted receive antenna polarization state chosen to maximize a signal quality metric.

FIG. 2 illustrates Poincaré Sphere 202 showing polarization states 106, 120 and 126, as described in FIG. 1. Polarization state 204 represents a state that is located substantially on the opposite side of Poincaré Sphere 202 relative to polarization state 120 of interferer antenna 116. In an aspect, polarization state 204 represents a substantially cross-polarized state of polarization state 120 of interferer antenna 116.

Arc 206 is represented on the Poincaré Sphere between polarization states 120 and 204. In an aspect, a search may be performed along arc 206 to find a receive antenna 112 polarization state 126 that maximizes an estimated signal quality metric, such as SINR. In another aspect, a search may be performed substantially along arc 206 to find a receive antenna 112 polarization state 126 that maximizes an estimated signal quality metric. In another aspect, a search may be performed based at least in part on arc 206 to find a receive antenna 112 polarization state 126 that maximizes an estimated signal quality metric.

For example, polarization state 126 may be adjusted using an appropriate search technique to substantially maximize an estimated signal quality metric before, during or after convergence of the search technique. As another example, a closed form solution may be used to determine polarization state 126 to substantially maximize an estimated signal quality metric. Further details regarding appropriate search techniques and closed form solutions are discussed more fully below.

Adaptive Polarization Array (APA) Algorithm

In an aspect, an Adaptive Polarization Array (APA) Algorithm is described for adjusting the polarization state of one or more antennas, over all polarization states, to a polarization state that maximizes a signal quality of a received signal.

Stated another way, the APA Algorithm may be used to optimally combine two nominally orthogonal receive antennas to emulate a single receive antenna having a polarization state that maximizes an estimated signal quality metric in the presence of interference.

In an aspect, an Adaptive Polarization Array (APA) Algorithm may employ an estimated signal quality metric, such as an estimated SINR at a receiver. A SINR Estimator may be used to determine an estimated SINR. In an aspect, the SINR Estimator may be based on received signal power, since low-cost transmitting units may lack sufficient phase stability to perform carrier recovery in the receiver. An example of a SINR Estimator is shown as follows:

$$SINR\_est := -10 \cdot \log \left\| \left( \text{corr}(\text{Signal\_Pwr}, \text{Preamble\_Pwr}) \cdot \frac{\text{stdev (Signal\_Pwr)}}{\text{mean(Signal\_Pwr)}} \cdot \frac{\text{mean(Preamble\_Pwr)}}{\text{stdev (Preamble\_Pwr)}} \right)^{-1} - 1 \right\| \quad (1)$$

where,

Signal_Pwr is the real-valued signal power array, over the preamble interval, and Preamble_Pwr is the real-valued ideal preamble power array.

For purposes of this disclosure, a preamble interval may be defined as any interval or intervals of the transmit and/or receive signal which contain unique and/or predetermined information.

Figure 3:
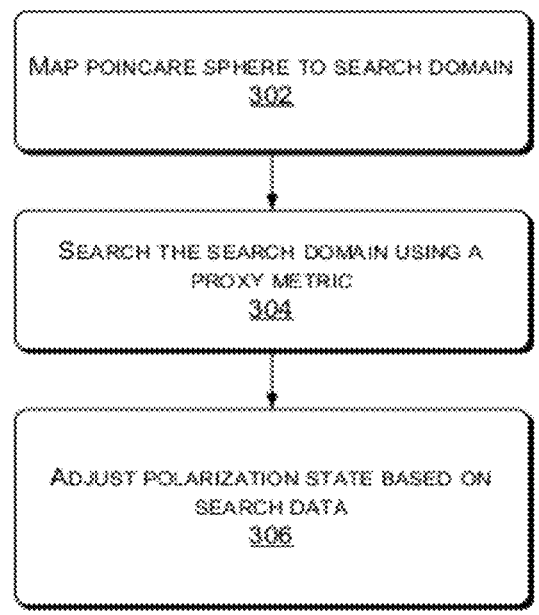
FIG. 3 is a flowchart showing an example method for adjusting a polarization state.

As an example, a method of optimally combining signals from two receive antennas having exactly orthogonal, nominally orthogonal or non-equal polarization to emulate a single receive antenna having a polarization state, may include mapping a surface of a Poincaré Sphere to a polarization search domain. A proxy metric may then be utilized for searching over the polarization search domain. The proxy metric may be a proxy for an estimated signal quality metric. In an aspect, a polarization state of the single receive antenna may be adjusted based on the searching FIG. 3 is a flowchart showing an example method for adjusting a polarization state of, for example, receive antenna 112. Method 300 begins at 302 where a surface, for example, an entire surface of a Poincaré Sphere, may be mapped to a polarization search domain. The polarization search domain may include a rectangular search domain. The polarization domain of the well known Poincaré Sphere contains two independent variables projected onto a 3-dimensional surface. Practically, however, the signals from the vertical and horizontal antennas may be provided to the APA algorithm as two complex baseband signals. Therefore, it may be more computationally efficient to devise a 2-dimensional polarization domain, such as a rectangular search domain, related directly to the two independent variables from the two complex baseband signals. These independent variables, represented by "tha" and "thda", may be defined as follows:

$$tha = \text{atan}\left(\frac{G_H}{G_V}\right) \quad (2)$$

where, $G_H$ is the gain applied to the Horizontal channel, $G_V$ is the gain applied to the Vertical channel, and thda=the angle of the phase rotation applied to the Horizontal channel.

Note that "tha" may be similar to a "linear polarization angle" of a receiver, while "thda" may control the ellipticity of the receiver polarization.

The surface of the Poincaré Sphere may be uniquely mapped to a rectangular domain, whereby:

$$0° <= tha <= 180°, \text{ and}$$

$$-90° <= thda <= 90°.$$

At 304, the polarization search domain may be searched, using for example, a proxy metric. The proxy metric may be a proxy for an estimated signal quality metric, such as an estimated SINR at a receiver. In an aspect, FIG. 4 illustrates searching the polarization search domain using, for example, an estimated signal quality metric (e.g., estimated SINR) versus a proxy metric.

Figure 4:
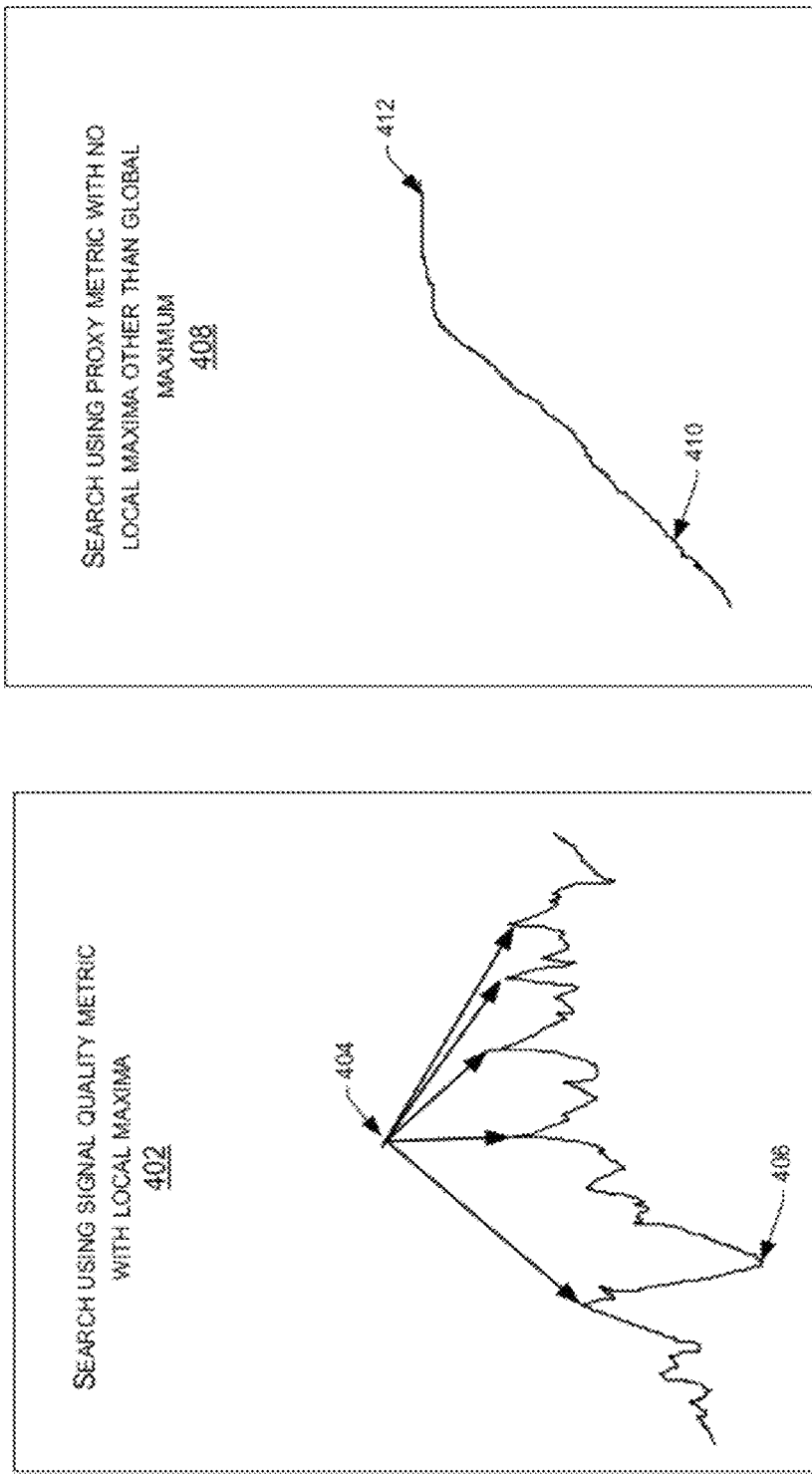
FIG. 4 illustrates a perspective view of an exemplary search domain with local maxima and a search domain with no local maxima other than a global maximum.

FIG. 4, item 400 shows using a signal quality metric, such as the estimated SINR, with local maxima 402 versus using a proxy metric with no local maxima other than a global maximum 408. In an aspect, global maximum 408 is a single global maximum representing a best or optimal search result.

In 402, using the signal quality metric with local maxima as the search metric, item 404 shows numerous local maxima and local minima 406 which complicate the search process. The search process may be complicated because searching may constantly require broadening and narrowing a search range within the search domain to attempt to determine if the search may be stuck on, for example, one of local maxima 404. Determining convergence criteria may also prove difficult because it is hard for the search technique to determine if the current local maxima (e.g., a particular one of local maxima 404) is the largest local maxima within the search domain. Item 406 further indicates that the search of the search domain may not be monotonic, because local maxima may be distributed in a somewhat random fashion throughout the search domain. As shown in 402, the search domain appears erratic and absent an orderly way to quickly search for a global maximum. The search conditions illustrated in 402 may be the case when searching a search domain using an estimated signal quality metric, such as the estimated SINR (e.g., SINR_est of equation (1)).

In an aspect, to improve search performance, a proxy metric may be used. A proxy metric may be selected that is an "exact proxy" for the estimated SINR. The proxy metric is "exact" in the sense that the proxy metric (e.g., an SINR proxy) maximum will always occur at the same domain (e.g., polarization search domain) point as the estimated SINR maximum. In an aspect, a proxy metric that yields a well-behaved and monotonic search over the entire polarization search domain may be selected. Also in some examples, a proxy metric that exhibits no local maxima other than a single global maximum may be selected. A search using such a proxy metric is illustrated in 408 of FIG. 4. At 410, searching via the proxy metric is shown to be substantially monotonic over the polarization search domain, with no local maxima. At 412, a global maximum is illustrated. Thus, 408 illustrates that use of an appropriately selected proxy metric may result in a monotonic search, absent local maxima, with a relatively easy to find global maximum. Since only a single global maximum 412 exists, the global maximum represents an optimum solution over the polarization search domain. Additionally, determining convergence of the search is much easier in 408 as compared to 402, due to the substantially monotonic nature of the search, the lack of numerous local maxima and the presence of the single global maximum 412.

Thus, the proxy metric may be used to find a location or point within the polarization search domain that is a maximum of, for example, an estimated SINR. Once found, then the estimated SINR may be used to calculate the maximum estimated SINR. As an example, the proxy metric may be a SINR proxy (e.g., SINR_proxy) represented by the following equation:

$$\text{SINR\_proxy} := \text{corr}(\text{Signal\_Pwr}, \text{Preamble\_Pwr}) \cdot \frac{stdev(\text{Signal\_Pwr})}{mean(\text{Signal\_Pwr})} \quad (3)$$

where,

Signal_Pwr is the real-valued signal power array, over the preamble interval, and Preamble_Pwr is the real-valued ideal preamble power array.

Referring back to FIG. 3, at block 306, a polarization state (e.g., polarization state 126) of an antenna is adjusted based on the search of the polarization search domain. In an aspect, the polarization search domain may be a rectangular search domain. In another aspect, the antenna may be two receive antennas having nominally orthogonal or non-equal polarization represented or emulated as a single receive antenna (e.g., a receive D-pol antenna) having an arbitrary polarization state. In another aspect, the search yields the global maximum associated with a maximum estimated SINR for transmitted polarized signal 110 in the presence of interfering polarized signal 124.

Method 300 may be described in the general context of computer-executable instructions stored on a computer-readable media. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

In an aspect, as stated above, the APA Algorithm may be used for the combining of vertical and horizontal channels of receive antennas. For example, the effective polarization of a receiver may be set by the combining the vertical and horizontal channels, through the setting of the polarization domain variables "tha" and "thda", as follows:

$$\text{Signal\_Pwr}_i := \left(\left|vv_i \cdot \sin\left(tha \cdot \frac{\pi}{180}\right) + hh_i \cdot \cos\left(tha \cdot \frac{\pi}{180}\right) \cdot e^{j \cdot thda \cdot \frac{\pi}{180}}\right|\right)^2 \quad (4)$$

where,

Signal_pwr is the real-valued signal power array, over the preamble interval, defined earlier, vv=the Vertical channel complex baseband array, over the Preamble interval, and hh=the Horizontal channel complex baseband array, over the Preamble interval.

In an aspect, the APA search algorithm provides for a fast search for the global maximum of a SINR proxy, over a mapped rectangular polarization domain. In another aspect, the APA search algorithm provides for a fast substantially monotonic search for the global maximum of a SINR proxy, over a mapped rectangular polarization domain.

Furthermore, methods described herein may be applied to any signal-quality metric of interest, provided a suitable proxy metric can be developed or determined.

An implementation of the search algorithm is shown in Table 1 below. The arguments for the search algorithm include:

vv=the Vertical channel complex baseband array, over the Preamble interval, defined earlier.

hh=the Horizontal channel complex baseband array, over the Preamble interval, defined earlier.

Note that the algorithm also uses an array called "preamble". This array may be the same as the Preamble_Pwr array defined earlier, but with a shortened name in the algorithm for convenience.

TABLE 1

```
searchAPA (vv , hh ) :=  | tha ← 35
                         | thda ← 2
                         | done ← 0
                         | coun ← 0
                         | counb ← 0
                         | adelta ← 1
                         | bdelta ← adelta
                         | lastc ← −10^99
                         | aswitch ← 0
                         | bswitch ← 0
                         | afirst ← 0
                         | while done = 0 ∧ coun < 100
                         |   | fudge ← 0
                         |   | tha ← tha + adelta
                         |   | if tha = 0 ∨ tha = 180 ∨ tha = 90
                         |   |   | fudge ← 1
                         |   |   | tha ← tha + adelta
                         |   | tha ← tha − 180 if tha > 180
                         |   | tha ← tha + 180 if tha < 0
                         |   | aslast ← aswitch
                         |   | aswitch ← 0
                         |   | for i ∈ 0 ... N − 1
```

$$\left| \text{sptemp}_i \leftarrow \left(\left|vv_i \cdot \sin\left(tha \cdot \frac{\pi}{180}\right) + hh_i \cdot \cos\left(tha \cdot \frac{\pi}{180}\right) \cdot e^{j \cdot thda \cdot \frac{\pi}{180}}\right|\right)^2 \right.$$

$$\left| c \leftarrow \text{corr (sptemp, preamble)} \cdot \frac{\text{stdev (sptemp)}}{\text{mean (sptemp)}} \right.$$

```
                         |   | if c < lastc
                         |   |   | tha ← tha − adelta
                         |   |   | adelta ← − adelta
                         |   |   | aswitch ← 1
                         |   |   | c ← lastc
                         |   |   | afirst ← 1 if coun > 1
                         |   | lastc ← c if c ≥ lastc
                         |   | if afirst = 1
                         |   |   | thda ← thda + bdelta
                         |   |   | bslast ← bswitch
                         |   |   | bswitch ← 0
                         |   |   | for i ∈ 0 ... N − 1
```

$$\left|\left| \text{sptemp}_i \leftarrow \left(\left|vv_i \cdot \sin\left(tha \cdot \frac{\pi}{180}\right) + hh_i \cdot \cos\left(tha \cdot \frac{\pi}{180}\right) \cdot e^{j \cdot thda \cdot \frac{\pi}{180}}\right|\right)^2 \right.\right.$$

$$\left|\left| c \leftarrow \text{corr (sptemp, preamble)} \cdot \frac{\text{stdev (sptemp)}}{\text{mean (sptemp)}} \right.\right.$$

```
                         |   |   | if c < lastc
                         |   |   |   | thda ← thda − bdelta
                         |   |   |   | bdelta ← − bdelta
                         |   |   |   | bswitch ← 1
                         |   |   |   | c ← lastc
                         |   |   | counb ← counb + 1
                         |   | lastc ← c if c ≥ lastc
```

TABLE 1-continued

```
|    |    coun ← coun + 1
|    |    done ← 1 if (aswitch · bswitch · aslast · bslast = 1)∧ counb > 3
|  if thda > 90
|    |    tha ← 180 − tha
|    |    thda ← thda − 180
|  if thda < −90
|    |    tha ← 180 − tha
|    |    thda ← thda + 180
|  res₀ ← tha
|  res₁ ← thda
|  res₂ ← c
|  res₃ ← coun
|  res
```

APA Closed-Form Solution

A closed form solution for the maximum estimated SNR over the polarization search domain, as defined herein, may take a form as follows:

$$\text{Signal\_Pwr}_i := (|a \cdot vv_i + hh_i|)_2 \quad (5)$$

where a=complex gain applied to the Vertical Channel complex baseband array.

While not obvious, this formulation is equivalent to the polarization search domain described previously. The solution for "a" is:

$$a := \left( \frac{-B - \sqrt{B^2 - 4 \cdot A \cdot C}}{2A} \right) \quad (6)$$

where $$A := \text{mean}(\overrightarrow{(hh \cdot \overline{vv})}) \cdot \text{mean}(\overrightarrow{(\text{Preamble\_Pwr} \cdot vv \cdot \overline{vv})}) - \quad (7)$$
$$\text{mean}(\overrightarrow{(\text{Preamble\_Pwr} \cdot hh \cdot \overline{vv})}) \cdot \text{mean}(\overrightarrow{(vv \cdot \overline{vv})})$$

$$B := \text{mean}(\overrightarrow{(hh \cdot \overline{hh})}) \cdot \text{mean}(\overrightarrow{(\text{Preamble\_Pwr} \cdot vv \cdot \overline{vv})}) - \quad (8)$$
$$\text{mean}(\overrightarrow{(\text{Preamble\_Pwr} \cdot hh \cdot \overline{hh})}) \cdot \text{mean}(\overrightarrow{(vv \cdot \overline{vv})}) \ldots +$$
$$\text{mean}(\overrightarrow{(hh \cdot \overline{vv})}) \cdot \text{mean}(\overrightarrow{(\text{Preamble\_Pwr} \cdot vv \cdot \overline{hh})}) -$$
$$\text{mean}(\overrightarrow{(\text{Preamble\_Pwr} \cdot hh \cdot \overline{vv})}) \cdot \text{mean}(\overrightarrow{(vv \cdot \overline{hh})})$$

$$C := \text{mean}(\overrightarrow{(hh \cdot \overline{hh})}) \cdot \text{mean}(\overrightarrow{(\text{Preamble\_Pwr} \cdot vv \cdot \overline{hh})}) - \quad (9)$$
$$\text{mean}(\overrightarrow{(\text{Preamble\_Pwr} \cdot hh \cdot \overline{hh})}) \cdot \text{mean}(\overrightarrow{(vv \cdot \overline{hh})})$$

Note that in an embodiment, all quantities in the above equations are generally complex-valued. For notational clarity the vector arrow notation, used in equations 7, 8 and 9, is used to denote an array element by element multiplication, as defined in the following example:

$$\text{mean}(\overrightarrow{(\text{Preamble\_Pwr} \cdot hh \cdot \overline{vv})}) := \frac{\sum_{i=0}^{N-1} (\text{Preamble\_Pwr}_i \cdot hh_i \cdot \overline{vv}_i)}{N}$$

Figure 5:
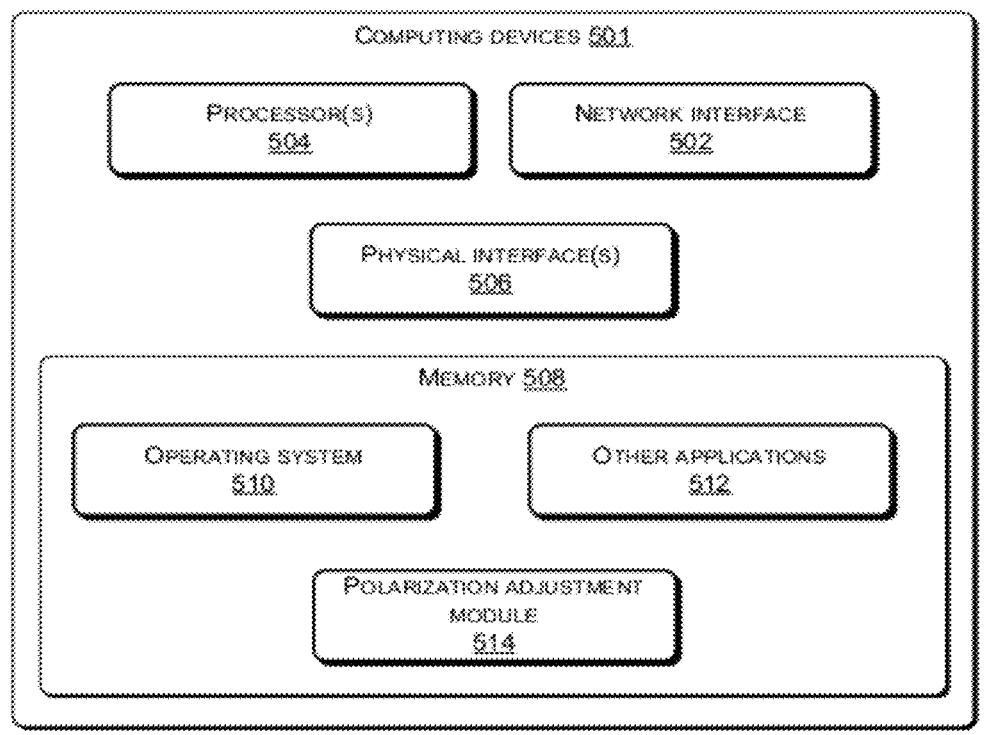
FIG. 5 is a block diagram that illustrates components of an example computing device for implementing polarization state adjustment.

FIG. 5 is a block diagram that illustrates computing environment 500 having one or more computing devices 502 for implementing the APA algorithm.

Computing device 501 includes one or more network interfaces 502, one or more processors 504, physical interfaces 506 and memory 508. Network interface 502 may be used to enable computing device 501 to communicate with other devices over a network. Physical interfaces 506 may allow computing devices 501 to directly connect to other devices or systems such as transmit antenna 102 and/or receive antenna 112.

Operating system 510, and one or more other applications 512 may be stored in memory 508 as computer-readable instructions, and are executed, at least in part, on processor(s) 504. Operating system 510 may facilitate execution of, and Input/Output (I/O) for, applications, software modules, software objects, applets, components and the like, as is common in the art.

Polarization adjust module 514 may be configured to execute the Adaptive Polarization Array (APA) Algorithm using all or part of the search techniques described herein and/or all or part of the APA Closed-form Solution. Polarization adjust module 514 may be configured to interface with operating system 510, physical interfaces 506, network interface 502, other applications 512, or the like, and facilitate control of external devices to implement the inventive aspects described herein.

Figure 6:
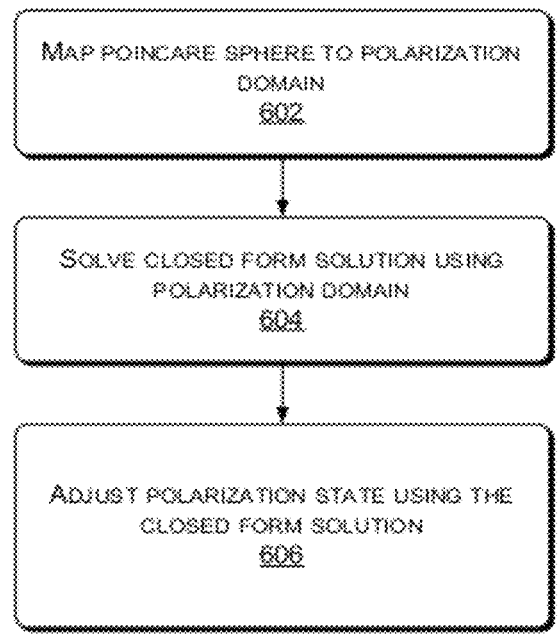
FIG. 6 is a flowchart showing an example method for adjusting a polarization state using a closed form solution.

FIG. 6 is a flowchart showing an example method for adjusting a polarization state of, for example, receive antenna 112, using a closed form solution, such as equation 5 above. Method 600 begins at 602 where a surface, for example, an entire surface of a Poincaré Sphere, may be mapped to a polarization domain. The polarization domain may include a rectangular domain. As an example, signals may be combined from two receive antennas having non-equal polarization to emulate a single receive antenna having a polarization state, such that the combining includes mapping a surface of the Poincaré Sphere to a polarization domain. At 604, the closed form solution may be solved using the polarization domain. At 606, the polarization state may be adjusted based on the solving of the closed form solution.

Conclusion

Various aspects of an Adaptive Polarization Array (APA) Algorithm have been described for adjusting the polarization state of antennas, such as D-pol antennas. The APA Algorithm may be used to search for a polarization state that maximizes a signal quality of a received signal. The search may facilitate adjustment of a polarization state of receive antennas to maximize a signal quality metric, such as a SINR. A proxy metric having no local maxima other than a single global maximum may be used to search the polarization search domain to find a best polarization state.

Additionally, while various discreet embodiments have been described throughout, the individual features of the various embodiments may be combined to form other embodiments not specifically described. The embodiments formed by combining the features of described embodiments may be applied to any signal-quality metric of interest, provided a suitable monotonic proxy can be developed.

The invention claimed is:

1. A method comprising:
   combining signals from two receive antennas having non-equal polarization to emulate a single receive antenna having a polarization state, the combining includes:
   mapping a surface of a Poincaré Sphere to a polarization search domain;
   searching over the polarization search domain using a proxy metric, the proxy metric being a proxy for an estimated signal quality metric; and
   adjusting the polarization state based on the searching, wherein the proxy metric is represented by the following equation:

$$\text{SINR\_proxy} := \text{corr}(\text{Signal\_Pwr}, \text{Preamble\_Pwr}) \cdot \frac{\text{stdev (Signal\_Pwr)}}{\text{mean(Signal\_Pwr)}}$$

wherein Signal Pwr is a real-valued signal power array over a preamble interval, and Preamble Pwr is a real-valued ideal preamble power array.

2. The method of claim 1, wherein the polarization search domain is a rectangular search domain.

3. The method of claim 2, wherein the mapping maps an entire surface of the Poincaré Sphere to the rectangular search domain.

4. The method of claim 1, wherein the estimated signal quality metric is an estimated Signal to Interference plus Noise Ratio (SINR) metric.

5. The method of claim 4, wherein a maximum in the proxy metric occurs at a same point in the polarization search domain as a maximum of the estimated SINR metric.

6. The method of claim 1, wherein the polarization state of the single receive antenna matches a polarization state of one or more transmit antennas that transmit the signals.

7. The method of claim 1, wherein the proxy metric has a single global maximum over the polarization search domain.

8. The method of claim 7, wherein the proxy metric is absent of local maxima other than the global maximum over the polarization search domain.

9. The method of claim 8, wherein an estimated signal quality metric is an estimated Signal to Interference plus Noise Ratio (SINR) of the signals that are combined and the global maximum is associated with a maximum estimated SINR.

10. The method of claim 1, wherein an estimated signal quality metric is an estimated Signal to Interference plus Noise Ratio (SINR) defined by the following equation:

$$\text{SINR\_est} := -10 \cdot \log \left\| \left( \text{corr}(\text{Signal\_Pwr}, \text{Preamble\_Pwr}) \cdot \frac{\text{stdev (Signal\_Pwr)}}{\text{mean(Signal\_Pwr)}} \cdot \frac{\text{mean(Preamble\_Pwr)}}{\text{stdev (Preamble\_Pwr)}} \right)^{-1} - 1 \right\|$$

where Signal_Pwr is a real-valued signal power array over the preamble interval, and Preamble_Pwr is a real-valued ideal preamble power array.

11. The method of claim 1, wherein the two receive antennas have nominally orthogonal polarization.

12. A method comprising:
   combining signals from two receive antennas having non-equal polarization into a single signal having a single polarization state to emulate a single receive antenna having the single polarization state, the combining includes:
   mapping a surface of a Poincaré Sphere to a polarization domain;
   solving a closed form solution based at least in part on the polarization domain, wherein the solving includes calculating a real valued signal power array based in part on determining a complex gain applied to a vertical channel complex baseband array; and
   adjusting the single polarization state based on the solving, wherein the closed form solution comprises:

$$\text{Signal\_Pwr}_i := (|a \cdot vv_i + hh_i|)^2$$

wherein i is an array element index, vv is a vertical channel complex baseband array over a preamble interval, hh is a horizontal channel complex baseband array over the preamble interval, and $$a := \overline{\left( \frac{-B - \sqrt{B^2 - 4 \cdot A \cdot C}}{2A} \right)}, \text{ wherein}$$

$$A := \text{mean}(\overline{(hh \cdot \overline{vv})}) \cdot \text{mean}(\overline{(\text{Preamble\_Pwr} \cdot vv \cdot \overline{vv})}) - \text{mean}(\overline{(\text{Preamble\_Pwr} \cdot hh \cdot \overline{vv})}) \cdot \text{mean}(\overline{(vv \cdot \overline{vv})})$$

$$B := \text{mean}(\overline{(hh \cdot \overline{hh})}) \cdot \text{mean}(\overline{(\text{Preamble\_Pwr} \cdot vv \cdot \overline{vv})}) - \text{mean}(\overline{(\text{Preamble\_Pwr} \cdot hh \cdot \overline{hh})}) \cdot \text{mean}(\overline{(vv \cdot \overline{vv})}) \ldots + \text{mean}(\overline{(hh \cdot \overline{vv})}) \cdot \text{mean}(\overline{(\text{Preamble\_Pwr} \cdot vv \cdot \overline{hh})}) - \text{mean}(\overline{(\text{Preamble\_Pwr} \cdot hh \cdot \overline{vv})}) \cdot \text{mean}(\overline{(vv \cdot \overline{hh})})$$

$$C := \text{mean}(\overline{(hh \cdot \overline{hh})}) \cdot \text{mean}(\overline{(\text{Preamble\_Pwr} \cdot vv \cdot \overline{hh})}) - \text{mean}(\overline{(\text{Preamble\_Pwr} \cdot hh \cdot \overline{hh})}) \cdot \text{mean}(\overline{(vv \cdot \overline{hh})}).$$

13. The method of claim 12, wherein the polarization domain is a rectangular domain.

14. The method of claim 13, wherein the mapping maps an entire surface of the Poincaré Sphere to the rectangular domain.

15. The method of claim 12, wherein the solving the closed form solution determines a signal quality metric.

16. The method of claim 15, wherein the signal quality metric includes a Signal to Interference plus Noise Ratio (SINR) metric.

17. The method of claim 16, wherein the SINR metric is a maximum SINR in the polarization domain.

18. A system comprising:
   a first receive antenna having a first polarization;
   a second receive antenna having a second polarization that is not equal to the first polarization;
   a processor to emulate a single receive antenna having a single polarization state by combining a first signal received by the first receive antenna with a second signal received by the second receive antenna, the processor executing computer executable instructions to:
   map a surface of a Poincaré Sphere to a polarization domain;
   solve a closed form solution based at least in part on the polarization domain, wherein solving the closed form solution includes calculating a real valued signal power array based in part on determining a complex gain applied to a vertical channel complex baseband array; and adjust the single polarization state based at least in part on the closed form solution adjusting the single polarization state based on the solving, wherein the closed form solution comprises:

$$\text{Signal\_Pwr}_i := (|a \cdot vv_i + hh_i|)^2$$

wherein i is an array element index, vv is a vertical channel complex baseband array over a preamble interval, hh is a horizontal channel complex baseband array over the preamble interval, and $$a := \overline{\left(\frac{-B - \sqrt{B^2 - 4 \cdot A \cdot C}}{2A}\right)}, \text{ wherein}$$

$$A := \text{mean}(\overrightarrow{(hh \cdot \overline{vv})}) \cdot \text{mean}(\overrightarrow{(\text{Preamble\_Pwr} \cdot vv \cdot \overline{vv})}) -$$

$$\text{mean}(\overrightarrow{(\text{Preamble\_Pwr} \cdot hh \cdot \overline{vv})}) \cdot \text{mean}(\overrightarrow{(vv \cdot \overline{vv})})$$

$$B := \text{mean}(\overrightarrow{(hh \cdot \overline{hh})}) \cdot \text{mean}(\overrightarrow{(\text{Preamble\_Pwr} \cdot vv \cdot \overline{vv})}) -$$

$$\text{mean}(\overrightarrow{(\text{Preamble\_Pwr} \cdot hh \cdot \overline{hh})}) \cdot \text{mean}(\overrightarrow{(vv \cdot \overline{vv})}) \ldots +$$

$$\text{mean}(\overrightarrow{(hh \cdot \overline{vv})}) \cdot \text{mean}(\overrightarrow{(\text{Preamble\_Pwr} \cdot vv \cdot \overline{hh})}) -$$

$$\text{mean}(\overrightarrow{(\text{Preamble\_Pwr} \cdot hh \cdot \overline{vv})}) \cdot \text{mean}(\overrightarrow{(vv \cdot \overline{hh})})$$

$$C := \text{mean}(\overrightarrow{(hh \cdot \overline{hh})}) \cdot \text{mean}(\overrightarrow{(\text{Preamble\_Pwr} \cdot vv \cdot \overline{hh})}) -$$

$$\text{mean}(\overrightarrow{(\text{Preamble\_Pwr} \cdot hh \cdot \overline{hh})}) \cdot \text{mean}(\overrightarrow{(vv \cdot \overline{hh})}).$$

19. The method of claim 16, wherein the estimated signal quality metric is an estimated Signal to Interference plus Noise Ratio (SINR) defined by the following equation:

$$\text{SINR\_est} := -10 \cdot \log\left[\left(\text{corr}(\text{Signal\_Pwr}, \text{Preamble\_Pwr}) \cdot \frac{stdev(\text{Signal\_Pwr})}{\text{mean}(\text{Signal\_Pwr})} \cdot \frac{\text{mean}(\text{Preamble\_Pwr})}{stdev(\text{preamble\_Pwr})}\right)^{-1} - 1\right]$$

wherein the Signal_Pwr is a real-valued signal power array over the preamble interval, and Preamble_Pwr is a real-valued ideal preamble power array.

\* \* \* \* \*